United States Patent [19]
Brachos et al.

[11] Patent Number: 6,062,632
[45] Date of Patent: May 16, 2000

[54] VEHICLE BODY COLLISION ENERGY ABSORPTION SYSTEM

[75] Inventors: Vasilios Brachos, Lowell; Kenneth W. Sghia-Hughes, Acton; Wayne D. Kirk, Methuen; Craig D. Douglas, deceased, late of Lexington, all of Mass., by Ian Theodore Douglas, executor

[73] Assignee: Solectria Corporation, Wilmington, Mass.

[21] Appl. No.: 09/045,659

[22] Filed: Mar. 20, 1998

[51] Int. Cl.[7] .................................................. B60R 21/04
[52] U.S. Cl. ............................................. 296/189; 296/188
[58] Field of Search ..................................... 296/188, 189; 293/120, 122, 121, 132, 133, 109; 280/751

[56] References Cited

U.S. PATENT DOCUMENTS

| | | | |
|---|---|---|---|
| 3,852,150 | 12/1974 | Weller | 428/53 |
| 3,930,665 | 1/1976 | Ikawa | 250/150 |
| 4,072,334 | 2/1978 | Seegmiller et al. | 293/110 |
| 4,148,505 | 4/1979 | Jensen et al. | 280/784 |
| 4,183,574 | 1/1980 | Klie et al. | 296/188 |
| 4,352,484 | 10/1982 | Gertz et al. | 256/13.1 |
| 4,466,646 | 8/1984 | Delmastro et al. | 293/117 |
| 4,545,172 | 10/1985 | Wardill | 52/795 |
| 4,635,981 | 1/1987 | Friton | 293/1 |
| 4,711,481 | 12/1987 | Krage et al. | 293/133 |
| 4,900,082 | 2/1990 | Schwuchow et al. | 296/194 |
| 5,040,335 | 8/1991 | Grimes | 49/502 |
| 5,219,197 | 6/1993 | Rich et al. | 293/120 |
| 5,435,619 | 7/1995 | Nakae et al. | 296/189 |
| 5,700,545 | 12/1997 | Audi et al. | 293/133 |
| 5,772,267 | 6/1998 | Helm et al. | 293/133 |
| 5,806,889 | 9/1998 | Suzuki et al. | 296/188 |
| 5,806,901 | 9/1998 | Tennyson et al. | 296/136 |
| 5,915,775 | 6/1999 | Martin et al. | 296/35.2 |

OTHER PUBLICATIONS

Mark Hughes, "Lotus Elan; The Assembly Line"; pp. 64–107; Ospray Publishing, Jan. 1992.

*Primary Examiner*—D. Glenn Dayoan
*Assistant Examiner*—Lori L. Coletta
*Attorney, Agent, or Firm*—Hayes, Soloway, Hennessey, Grossman & Hage, P.C.

[57] ABSTRACT

A crash energy absorption system for a motor vehicle, formed of an assembly of panels of lightweight core material sandwiched within and bonded to reinforcing or stiffener skins. Preferably, the reinforcing or stiffener skins comprise fiberglass, graphite, Kevlar or Spectra reinforced polymers with any combination of fibers and/or fiber orientations, or metal sheets, or ceramic sheets, while the lightweight core material comprises a low-density, dimensionally stable material such as balsa wood, synthetic foam material such as polyurethane foam. The crash energy absorption system may take the form of removable parts that are replaceable after an accident, or may be formed as integral parts of a monocoque body, or as a part of a composite body load-bearing frame.

27 Claims, 3 Drawing Sheets

VEHICLE BODY COLLISION ENERGY ABSORPTION SYSTEM

The U.S. Government has a paid-up license in this invention and the right in limited circumstances to require the patent owner to license others on reasonable terms as provided for by the terms of Agreement No. NVA972-94-2-0005 awarded by DARPA.

BACKGROUND OF THE INVENTION

The present invention relates to the field of collision energy absorption systems, and more particularly, to a lightweight, extremely effective energy absorption system for improving the energy management effectiveness of the primary crush zone of a vehicle. The invention has particular utility as a collision energy absorption system for impact of vehicles, and will be described in connection with such utility, although other utilities are contemplated.

While protecting a vehicle's occupants from injury in a crash is a challenge for every vehicle manufacturer, in the case of a small, lightweight car, it is a particular challenge, due in part to the limited ability of small cars to absorb collision energy, and the relative short crush distance which is a major factor in providing a ride-down or deceleration distance for the vehicle occupants. In a conventional steel-bodied vehicle, the body panels are shaped and reinforced to form crush or crumple zones that are designed to absorb collision energy while protecting the passenger compartment or so-called occupant interior cage. Smaller, lighter weight cars offer particular challenges to engineers to provide adequate crash energy absorption. Efforts to improve passenger compartment protection typically add weight to the vehicle and thus adversely affect fuel economy. Moreover, simply reinforcing passenger compartment structural integrity may impose intolerably high "G" loads on occupants, as a result of strengthening the vehicle without also improving deceleration properties of the vehicle.

In addition to passenger protection, there are other considerations. For example, energy conservation requires reducing weight. The most dramatic method of reducing weight in mass produced conventional vehicles is to downsize the vehicles. However, crash data and tests on smaller vehicles show that small vehicles generally provide less protection to passengers, especially in collisions with larger vehicles.

Composite materials can provide significant weight savings when used to make vehicle components. Although composite materials have been produced for many years and have found their way into many non-structural components of vehicles, composite materials heretofore have not been used in critical crash protection areas, in part because composite materials typically are more brittle than steel, tending to break rather than bend, buckle or crumple and absorb energy.

OBJECTS OF THE INVENTION

It is thus an object of the present invention to provide a collision energy absorption system that overcomes the aforesaid and other disadvantages of the prior art. A more particular object of the invention is to provide a collision energy absorption system formed of light weight composite materials which composite materials may be employed as a crush zone and/or as a structural element.

SUMMARY OF THE INVENTION

The present invention provides a crash energy absorption system for a vehicle, formed of composite cored panels. More particularly, the crash energy absorption system of the present invention comprises a crush structure formed of an assembly of panels. The cored panels are assembled together in a way that provides geometric stiffening to avoid buckling of the individual panels. The panels are made of lightweight core material sandwiched within and attached to reinforcing or stiffener skins. Preferably, the reinforcing or stiffener skins comprise polymer reinforced with fiberglass, graphite, Kevlar or Spectra fibers in any possible combination of orientation of the fibers, or metal sheets, or ceramic sheets, or other materials that have a higher density than the inner core materials. The lightweight core material comprises a low-density, dimensionally stable material such as balsa wood, or a synthetic foam material such as polyurethane foam, or low density polyvinyl chloride, or a composite core made from dimensionally stable synthetic foam material with through the thickness reinforcing fibers. Core materials can also comprise all neat, filled or foamed polymers or ceramics. Cores that provide through the thickness reinforcing fibers offer better results. The crash energy absorption system may take the form of removable parts that are replaceable after an accident, or may be formed as integral parts of a monocoque body, or as a part of a composite body load-bearing frame. In any of the above cases the crash energy absorption system can have multiple uses which could include body stiffener, load path, component mounting, aerodynamic shaping for better airflow, exterior body panel.

Using the lightweight crash energy absorption system of the present invention, the structure can be optimized to crush evenly and consistently in accordance with predetermined load and property energy absorption characteristics. The design depends on the ability of the composite core panels to not only absorb energy, but to do so in a stable manner. Using this property of the cored panels, the crush loads could be tuned to the desired levels by adjusting the specific energy absorption of the cored panels. The exact combination of mechanisms of failure during stable crush of the cored panels depends on skin and cored content. The stable crushing of the cored panels is accomplished by permitting one end of the crush structure to crush freely, avoiding global buckling, and by avoiding any permanent attachments to the crush structure, which could hinder the stable crushing of the composite core panels or promote buckling. Crush initiators, or triggering mechanisms can be employed to induce stable crush of the cored panels and avoid potentially fatal to the vehicle occupants, high G loading during the initial stages of a vehicle impact. The crash structure of the present invention, while crushing, transfers the load into the remaining structure of the vehicle through energy transfer or load paths designed into the crush structure, i.e. by means of the composite cored panels reinforcing skins and additional reinforcements.

BRIEF DESCRIPTION OF THE DRAWINGS

Other features and advantages of the present invention will become apparent from the following detailed description of one possible application of the present invention to a motor vehicle, taken in conjunction with the accompanying drawings, wherein like numerals depict like parts, and, wherein.

DETAILED DESCRIPTION OF THE PREFERRED EMBODIMENT

Figure 1:
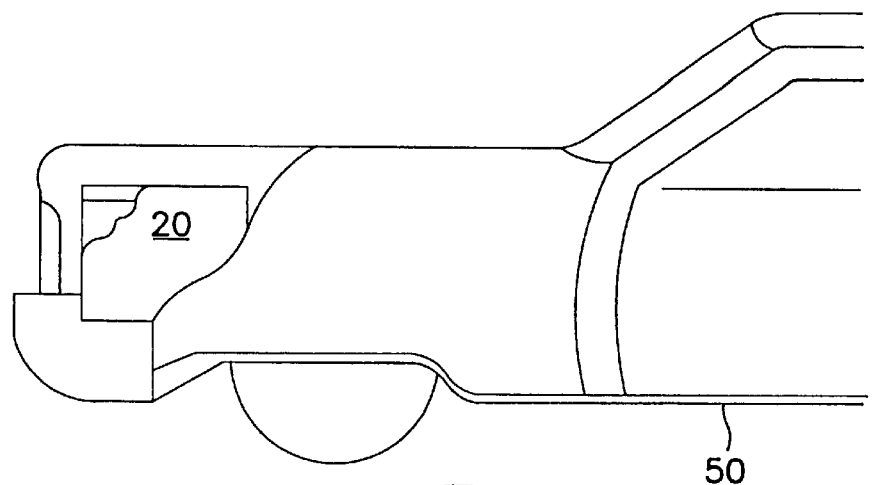
FIG. 1 is a side elevational cutaway view of the front section of a motor vehicle equipped with a crash energy absorption system made in accordance with the present invention.
Figure 2:
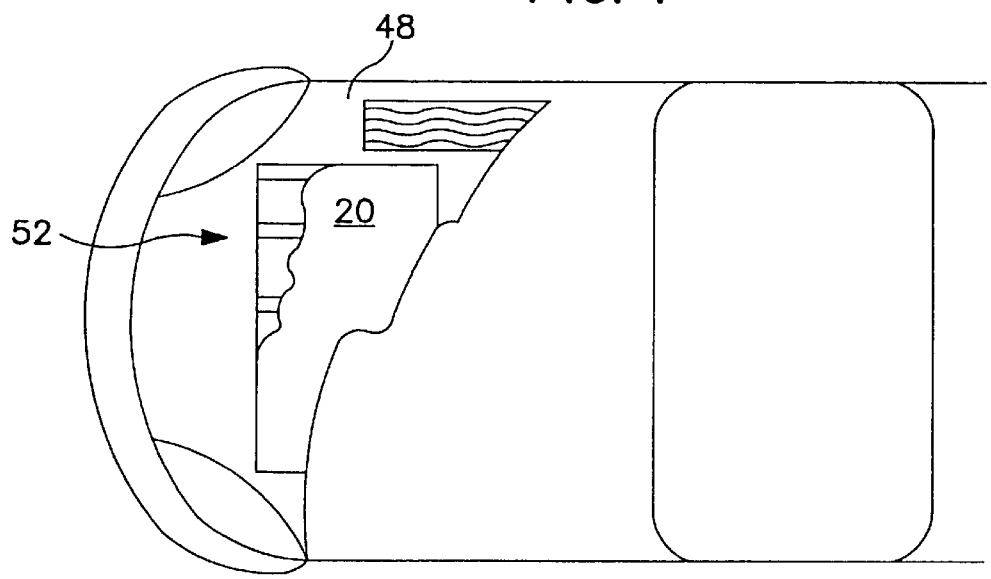
FIG. 2 is a top plan cutaway view of the front section of the motor vehicle body of FIG. 1.

Referring to FIGS. 1–2, there is illustrated a composite molded motor vehicle body formed predominantly of reinforced polymer matrix materials, which provides the dual advantages of relatively low-cost, and extremely low weight. Natural stiffness, i.e. vehicle torsional and bending stiffness, is achieved by suitable placement of structural fibers, and/or selected buildup of the polymer reinforced matrix material. Optionally steel reinforcing beams or the like (not shown) may be incorporated into the structure, or attached thereto using mechanical fasteners, or an adhesive.

For simplification and ease of illustration, elements such as the suspension, motor, seats, steering mechanism, etc. all have been omitted. It should be noted, however, that the vehicle may be powered by any type of power plant such as an internal combustion engine, an electric motor employing, e.g. a storage battery, fuel cell or solar cell energy source, a magnetic induction motor, or a hybrid combustion fuel/ electric motor powered vehicle.

A feature and advantage of the present invention is the ability to tailor the vehicle occupant crash energy absorption system to anticipated loading forces that would result in a crash. For example, consider a compact motor vehicle, fully loaded, that weighs approximately 1182 kilograms (2,600 lbs.). At 30 mph (48 km/hr) in the case of frontal impact of the vehicle, the energy that has to be absorbed is 106,000 Joules (78,000 foot pounds). Assuming an acceptable sustained "G" loading of 15 G's during impact, the load that has to be sustained by the crash structure during impact is 173,000 N (Newtons), (39000 lbs) all within a crush distance of about 0.6 meters (24 inches).

Figure 3:
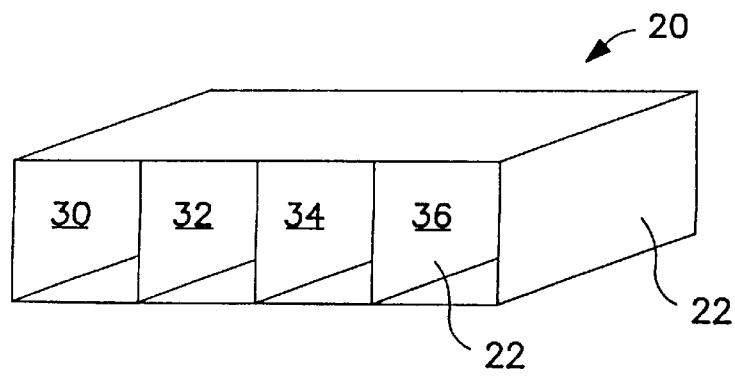
FIG. 3 is a perspective view of a crash energy absorption system of the present system.
Figure 4:
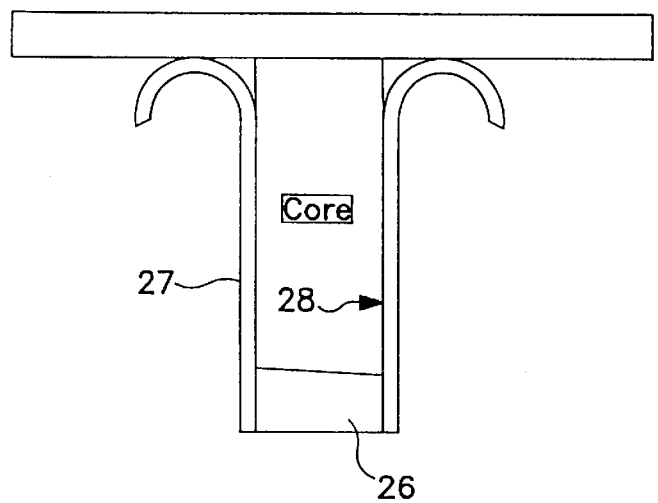
FIG. 4 is a top plan cutaway view of an energy absorbing element, i.e. cored panel, of the crush energy absorption system made in accordance with the present invention, and its crushing behavior.

Referring also to FIGS. 3 and 4, a crash energy absorption system in accordance with the present invention comprises a cell assembly 20 formed of a plurality of composite core panel members 22. Panel members 22 each comprise a core 26 formed of a dimensionally stable lightweight material sandwiched between and bonded to reinforcing skin members 26, 28. Preferably core 26 is adhesively bonded to reinforcing skin members 27, 28. By way of example, core 26 may comprise a sheet or composite sheet of half-inch thick balsa wood, while reinforcing skin members 26,28 comprise two-plies of 6 ounce epoxy resin impregnated fiberglass bonded to the core 26. This composite cored panel material offers 6,000 N/m average load carrying capability in edgewise crushing.

Figure 5:
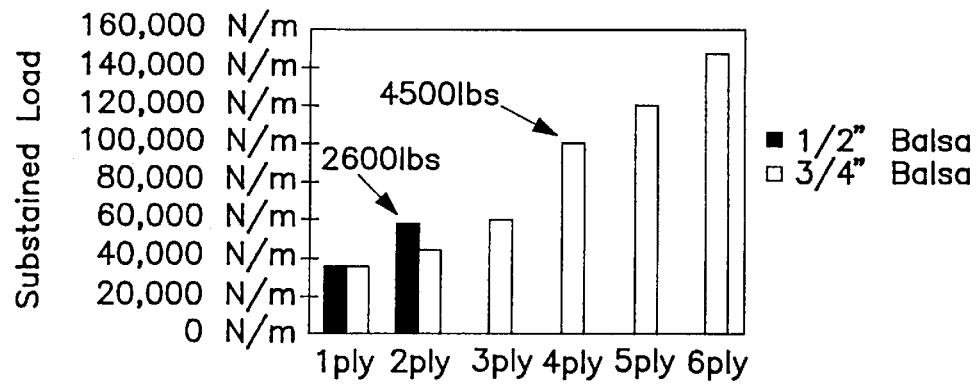
FIG. 5 is a graph depicting sustained load versus number of reinforcing skin plies of an energy absorption panel element made in accordance with the present invention.

Cell assembly 20 comprises a structure comprising a plurality, e.g. 4 equal sized, 10×10 in square, cells 30,32, 34,36 formed of composite cored panels 22. It should be noted, however, that cells 30, 32, 34, 36 need not all be the same dimension. Also, panel member architecture, reinforcing skin thickness and core thickness, numbers of plies of reinforcing skins, cell count and cell geometry all may be varied depending on the particular loading required, and the geometry of the space into which the cell assembly is fitted. For example, for a vehicle weighing 4,500 lbs., in order to achieve an average sustained g loading of 15 G's using a similar four square 10×10 inch crush structure as described above, crush load is determined as follows: Crush load= g's×vehicle mass=15×4,500 lbs.=67,500 lbs (300,240 N). Thus, for a total width (linear dimension) of crush panels of 3.175 m, in order to sustain the desired crush load the panel members will need to have a load carrying capacity of 94,564 N/M. Referring to the graph (FIG. 5), this corresponds to a 4 ply 6 ounce epoxy resin impregnated fiberglass skin bonded to a ¾ inch thick balsa wood core.

Referring again to FIG. 4, upon a crash, the skins 26, 28 peel or buckle, while the presence of the core 26 provides buckling on an elastic foundation. If desired, skins 26, 28 could be shaped with controlled failure lines.

Figure 9:
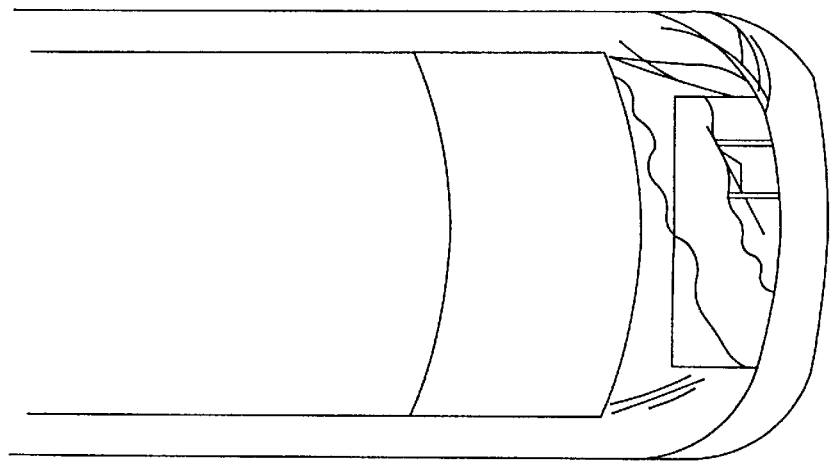
FIGS. 8 and 9 are views similar to FIGS. 1 and 2 of an alternative use in a motor vehicle of the present invention.
Figure 6:
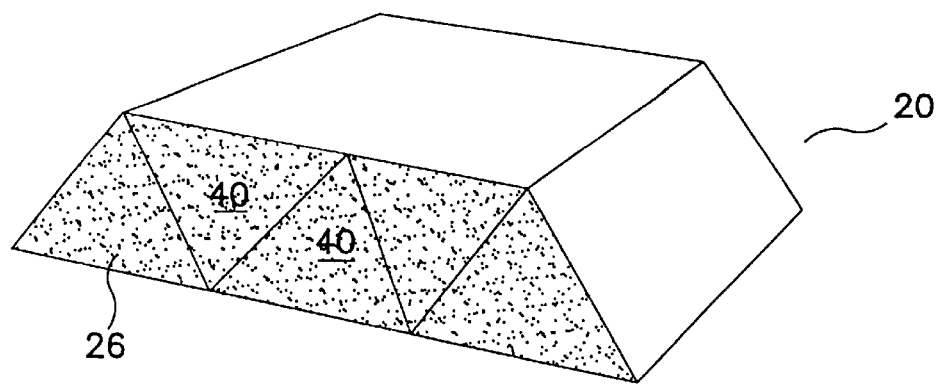
FIGS. 6–7 are views similar to FIG. 4 of alternative crash energy absorption systems made in accordance with the present invention.
Figure 7:
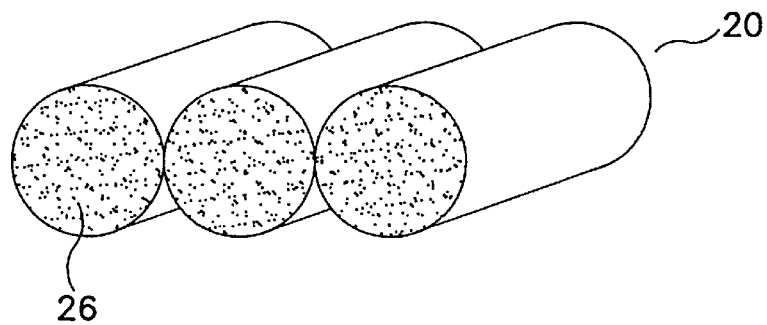
Figure 8:
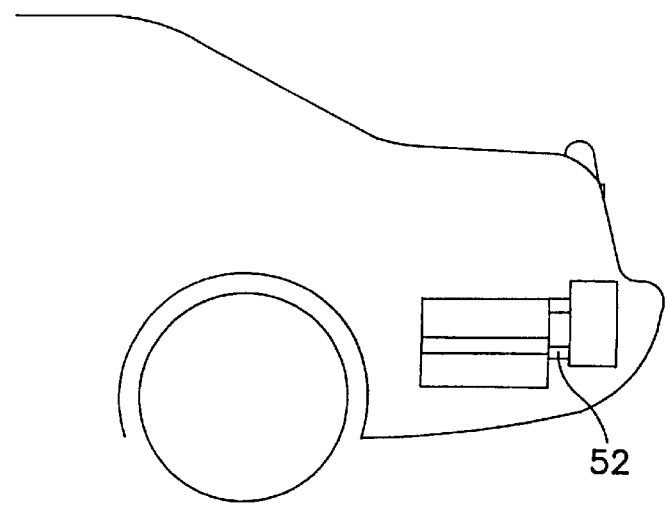

Various changes may be made in the above invention without departing from the spirit and scope thereof. For example, the crash energy absorption system cell assembly may comprise other geometric shapes such as triangles 40 (FIG. 6), or cylinders (FIG. 7). Also, the crash energy absorption system cell assemblies of the present invention may be formed as an integral part of a monocoque body 48 or affixed to or integral with a vehicle body load-bearing frame 50. The crush structure application is not limited by crash distance availability. It could be used to address occupant protection in any type of impact, like frontal (FIGS. 1 and 2), rear (FIGS. 8 and 9) and side. In each case, a key is to allow one end 52 of the crush structure to crush freely, and to avoid any permanent attachments to the crush structure that could hinder the stable crushing of the sandwich panels. The crash structure while crushing absorbs significant amounts of energy and slows deceleration, while carrying load into the remaining structure of the vehicle.

What is claimed is:

1. A crash energy management system for a motor vehicle comprising a plurality of axially aligned, open-ended hollow cells formed of an assembly of a plurality of cells, each cell being defined by at least one wall comprising a dimensionally stable, lightweight core material sandwiched between and attached to reinforcing skins, wherein said reinforcing skins comprise a plurality of plies of sheets adhesively bonded to one another.

2. A system according to claim 1, wherein said core material comprises balsa wood.

3. A system according to claim 1, wherein said core material comprises a dimensionally stable foam material.

4. A system according to claim 1, wherein said reinforcing skins comprise resin impregnated fiberglass, graphite or Kevlar.

5. A system according to claim 1, wherein said reinforcing skins comprise metal or ceramic sheets.

6. A system according to claim 1, and comprising an array of cells in the form of rectangles in cross-section.

7. A system according to claim 6, wherein said array comprises a plurality of equal sized rectangular cells in cross-section.

8. A system according to claim 1, and comprising an array of cells in the form of triangles in cross-section.

9. A system according to claim 1, and comprising an array of cells in the form of cylinders in cross-section.

10. A system according to claim 1 formed as an integral part of a vehicle body.

11. A system according to claim 1 formed as an integral part of a load-bearing frame of a vehicle.

12. A system according to claim 1, wherein the cells are non-symmetric in shape.

13. A system according to claim 1, wherein the cells are non-constant in cross-section.

14. A system according to claim 1, wherein said core comprises a fiber reinforced foam material.

15. A crash energy management system for a motor vehicle comprising a plurality of axially aligned open-ended hollow cells formed of an assembly of a plurality of cells, each cell being defined by at least one wall comprising a dimensionally stable, lightweight core material sandwiched between and formed in-situ between reinforcing skins, wherein said reinforcing skins comprise a plurality of plies adhesively bonded to one another.

16. A system according to claim 15, wherein said core material comprises a dimensionally stable foam material.

17. A system according to claim 15, wherein said reinforcing skins comprise resin impregnated fiberglass, graphite or Kevlar.

18. A system according to claim 15, wherein said reinforcing skins comprise metal or ceramic sheets.

19. A system according to claim 15, and comprising an array of cells in the form of rectangles in cross-section.

20. A system according to claim 19, wherein said array comprises a plurality of equal sized rectangular cells in cross-section.

21. A system according to claim 15 and comprising an array of cells in the form of triangles in cross-section.

22. A system according to claim 15, and comprising an array of cells in the form of cylinders in cross-section.

23. A system according to claim 15 formed as an integral part of a vehicle body.

24. A system according to claim 15 formed as an integral part of a load-bearing frame of a vehicle.

25. A system according to claim 1, wherein the cells are non-symmetric in shape.

26. A system according to claim 15, wherein said cells are non-constant in cross-section.

27. A system according to claim 1, wherein said core comprises a fiber reinforced foam material.

* * * * *